United States Patent Office 3,055,239
Patented Sept. 25, 1962

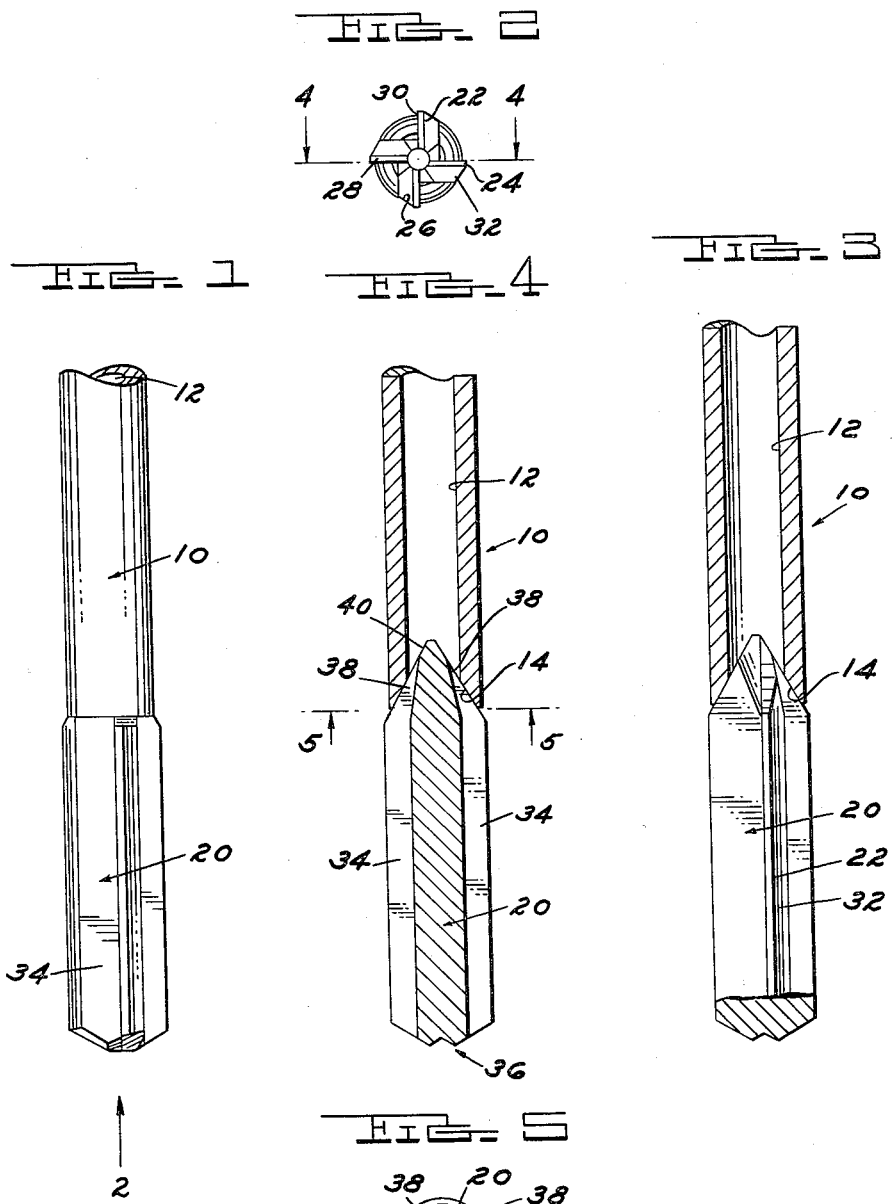

3,055,239
DEEP-HOLE DRILL AND REAMER
Rudolf W. Andreasson, 780 W. Maple Road,
P.O. Box 174, Birmingham, Mich.
Filed Feb. 11, 1960, Ser. No. 8,066
2 Claims. (Cl. 77—65)

This invention relates to a deep-hole drill and reamer. Frequently in the development of an art a simple solution to a problem eludes the workers in the art until a particular worker is suddenly struck with the idea.

In this particular case, the drilling construction contemplated is of that nature since it contemplates a very simple construction for achieving effective and efficient drilling and reaming operation with also effective cooling together with a construction which is inexpensive.

Briefly, the invention contemplates a use of a hollow tube with a relatively large central bore, the tube being provided at one end with a tapered outlet for the receiving of a tapered end of a wear tip, the tip being so slotted on its outer surface axially that the slots will communicate with the central passage of the tube, thus providing suitable outlet for the coolant without the necessity of any drilled passages or orifices in the tip. The tip is simply brazed into the conical recess at the end of the shank and the part is ready for operation.

Other objects and features of the invention relating to details of construction and operation will be apparent in the following description and claims.

Drawings accompany the disclosure and the various views thereof may be briefly described as:

FIGURE 1, a side elevation of a completed drill.
FIGURE 2, an end view on line 2 of FIGURE 1.
FIGURE 3, a sectional view of the shank showing the solid tip inserted therein.
FIGURE 4, a complete section of the assembled parts, taken on line 4—4 of FIGURE 2.
FIGURE 5, a sectional view on line 5—5 of FIGURE 4.

Referring to the drawings, it will be seen that the shank of the drill comprises a single hollow tube 10 having an opening 12. At the tip end of the shank is a tapered recess 14 in the side wall of the tube. The tip 20 of the drill is formed from a hard material such as high speed steel or tungsten carbide or the equivalent thereof, the cross-sectional shape being somewhat in the form of a star having four outwardly extending blades 22, 24, 26 and 28, each slightly off-set from the radial so that the leading edge 30 of each blade is approximately on radius and the drilling edges are spaced away from the radius, each leading edge having suitable clearance 32 formed thereon, FIGURE 2. The star formation of the device, as shown particularly in FIGURES 2 and 5, provides the axial passages or grooves 34. The drilling end of the tip 20 is provided with a suitable ground end 36 to provide cutting edges on the end of the flutes of the drill tip.

At the shank end of the tip the flutes 34 are formed inwardly toward the center at 38 so that each flute merges into the passage 12 of the tubular shank. This is best illustrated in FIGURE 5. The tapered end 40 at the shank end of the tip 20 is preferably brazed into the tapered opening 14 in the shank. The basic diameter of the tip 20 is greater than that of the shank so that chips may pass up around the shank outwardly thereof.

Thus I have provided a simple drill construction with adequate coolant passages none of which need be drilled into the parts. The basic drill point 20 can be cast or molded if desired and ground to size. When the tip is ground down axially to the point that further sharpening is impractical, the entire drill can be disposed of since the shank is an inexpensive portion of the assembly. The shank being full round provides adequate resistance to twisting torque. Since there are no drilled holes in the tip it may be ground for a substantial portion of its length before losing its effectiveness. The construction is adaptable to a large range of drill sizes.

I claim:

1. A deep-hole drill and reamer which comprises a bit of hard material, such as tungsten carbide having a cutting end and shank end, and being elongate in form, circular in general cross-section and having a plurality of equally spaced and identical axial surface flutes extending the full length of said bit each with a wall terminating in a general radial direction at a leading edge at the periphery of the bit, said wall also terminating at the cutting end of the bit in a radial cutting edge, and a shank secured to the shank end of said bit comprising a tube having an outer diameter slightly less than that of said bit and an inner diameter greater than the inner diameter of said flutes at the shank end, said tube being recessed at one end to receive the shank end of said bit wherein the flutes of said bit connect to the interior of said tube to allow free flow of coolant to said flutes and the cutting end of said bit.

2. A deep-hole drill and reamer which comprises a bit of hard material, such as tungsten carbide having a cutting end and shank end, and being elongate in form, circular in general cross-section and having a plurality of equally spaced and identical axial surface flutes each extending the full length of the bit and each with a wall terminating in a general radial direction at a leading edge at the periphery of the bit, said wall also terminating at the cutting end of the bit in a radial cutting edge, the shank end of the bit being tapered, and said flutes extending slightly inward radially toward said tapered end, and a shank secured to the shank end of said bit comprising a tube having an outer diameter slightly less than that of said bit and an inner diameter greater than the inner diameter of said flutes at the shank end, said tube being recessed at one end to receive the tapered end of said bit wherein the flutes of said bit connect to the interior of said tube to allow free flow of coolant to said flutes and the cutting end of said bit.

References Cited in the file of this patent

UNITED STATES PATENTS

| | | |
|---|---|---|
| Re. 24,769 | Willingham | Jan. 19, 1960 |
| 1,189,727 | Oakley | July 4, 1916 |
| 1,513,350 | Stolle | Oct. 28, 1924 |